United States Patent
Yuan et al.

(10) Patent No.: US 8,570,844 B1
(45) Date of Patent: Oct. 29, 2013

(54) ABSORPTION ENHANCED MEDIA FOR ENERGY ASSISTED MAGNETIC RECORDING

(75) Inventors: HongXing Yuan, San Ramon, CA (US); Shing Lee, Fremont, CA (US); Zhong Shi, Dublin, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 270 days.

(21) Appl. No.: 13/019,095

(22) Filed: Feb. 1, 2011

(51) Int. Cl.
*G11B 11/00* (2006.01)

(52) U.S. Cl.
USPC ........................................ 369/13.38; 360/131

(58) Field of Classification Search
USPC ........... 369/13.07, 13.38–13.55; 360/135, 59; 428/831–833.2
See application file for complete search history.

(56) References Cited

U.S. PATENT DOCUMENTS

| | | | |
|---|---|---|---|
| 5,914,198 A * | 6/1999 | Miyamoto et al. | 428/828.1 |
| 6,830,824 B2 | 12/2004 | Kikitsu et al. | |
| 7,773,331 B2 | 8/2010 | Akagi et al. | |
| 2010/0074062 A1 | 3/2010 | Kamijima | |
| 2010/0110576 A1 | 5/2010 | Akagi | |
| 2010/0177426 A1 | 7/2010 | Kanegae | |
| 2010/0182714 A1 | 7/2010 | Kanbe | |
| 2010/0195249 A1 | 8/2010 | Tsuda | |
| 2012/0063278 A1 * | 3/2012 | Hirata et al. | 369/13.33 |

* cited by examiner

*Primary Examiner* — Tan X Dinh

(57) ABSTRACT

A magnetic recording media is disclosed. The media comprises a substrate, a recording layer disposed over the substrate, and a metallic layer disposed between the recording layer and the substrate. The recording layer is configured to receive an electromagnetic radiation, absorb a first portion of the electromagnetic radiation, and transmit a second portion of the electromagnetic radiation. The metallic layer comprises a non-magnetic metal and configured to reflect at least some of the second portion of the electromagnetic radiation towards the recording layer.

14 Claims, 7 Drawing Sheets

ABSORPTION ENHANCED MEDIA FOR ENERGY ASSISTED MAGNETIC RECORDING

FIELD OF THE INVENTION

The present invention generally relates to magnetic recording media and, in particular, relates to absorption enhanced media for energy assisted magnetic recording.

BACKGROUND

With current perpendicular magnetic recording technology, the magnetic recording areal density has been pushed to around 500~600 Gb/in$^2$, and has almost reached the physical upper limit imposed by the superparamagnetic effect. Even with the availability of a higher coercivity magnetic material such as FePt and CoPd, a poor writability resulting from saturation of the writing head is expected to become a bottle neck. Energy Assisted Magnetic Recording (EAMR) or Heat Assisted Magnetic Recording (HAMR) technology has become the common pursuit in data storage circle, since the technology offers a way to circumvent the writability bottleneck and further push the data areal density to 1 Tbit/in$^2$ and beyond. The EAMR/HAMR technology can eventually merge with the patterned media.

Near Field Transducer (NFT) is a critical element for an EAMR or HAMR head to transfer enough energy to a tiny bit region and heat the region up to a temperature close to the Currier Temperature temporarily so as to achieve the writability within the short duration. The scalability of the data areal density is determined by that of the NFT, and the writability of a recording layer with a very high coercivity material depends on the NFT delivery efficiency. All known NFT designs have a relatively low delivery efficiency, typically in the range of just a few percent.

FIG. 1 is a diagram depicting an exemplary optical module 100 in which light energy generated by a light source 110 (e.g., laser diode) is coupled to a waveguide 130 via a coupler 120. The coupler 120 can be a grating or simple butt coupling. Some of the light energy is lost in the coupler 120 due to scattering 101. The waveguide 130 guides and directs the light energy to a near field transducer (NFT) 140 and a recording media 150. While in the waveguide 130, some of the light energy is lost by scattering 103 in the waveguide due to process imperfections and also to the surrounding pole as pole absorption 104. The NFT 140 focuses the light energy received from the waveguide 130 into a nano-sized light beam and delivers the beam to the recording media so as to heat up a specific recording region thereof. Some of the light energy received by the NFT 106 is also lost due to NFT absorption 106. At least part of the light energy delivered to the recording media 150 from the NFT 140 is absorbed by the recording media as media absorption 105. Energy losses from the light source 110, the coupler scattering 101, and waveguide scattering 103 result in heat dissipation into slider 102.

As mentioned above, the NFT delivery efficiency is only a few percent, so power requirement for the light source 110 is quite high. For example, heat dissipation by a laser diode needs special care with consideration of the 30~40% of lasering efficiency and the light absorption by the adjacent magnetic elements due to the interaction of scattering light from waveguide resultant from taper, bend and process imperfections. Furthermore, besides the portion of energy delivered to the media 150, the absorption by the NFT 140 itself together with the pole absorption 104 can heat up the NFT 140 to a very high temperature at which the NFT 140 may melt and lose its function. Therefore, an improved heat management by minimizing energy losses is highly desired. One optimal way of minimizing the power requirement for the light source 110 is to maximize energy absorption in the media 150, especially in a recording layer thereof.

In certain aspects, the present disclosure provides a media stack design that maximizes the utilization efficiency of the electromagnetic energy delivered to the media from the NFT.

BRIEF SUMMARY OF THE INVENTION

A magnetic recording media is provided. The media can comprise a substrate, a recording layer, and a metallic layer disposed between the recording layer and the substrate. The recording layer can be configured to receive an electromagnetic radiation, absorb a first portion of the electromagnetic radiation, and transmit a second portion of the electromagnetic radiation. The metallic layer can comprise a non-magnetic metal and be configured to reflect at least some of the second portion of the electromagnetic radiation towards the recording layer.

A method of enhancing energy absorption in an energy assisted magnetic recording (EAMR) media is disclosed. The method can comprise directing an incident electromagnetic energy towards the EAMR media, the media comprising a substrate, a recording layer, and a metallic layer between the substrate and the recording layer. The method can further comprise causing a first portion of the incident electromagnetic energy to be absorbed at a recording region of the recording layer and a second portion of the incident electromagnetic energy to be transferred to the metallic layer. The method can further comprise the transferred electromagnetic energy causing a surface plasmon resonance excitation in the metallic layer. The surface plasmon resonance excitation can cause an enhanced electromagnetic absorption at the recording region.

A hard disk drive is disclosed. The drive can comprise an energy assisted magnetic recording (EAMR) media comprising a substrate, a recording layer, and a metallic layer disposed between the recording layer and the substrate. The drive can comprise an EAMR head for writing to the EAMR media. The EAMR head can comprise a write pole for providing a magnetic field for writing to a recording region of the recording layer, at least one laser for providing energy to the recording region to heat at least a portion the recording region to assist the writing, and a near field transducer (NFT) disposed adjacent to the write pole and coupled with the at least one laser, the NFT configured to direct the energy to the recording region.

DETAILED DESCRIPTION

Figure 1:
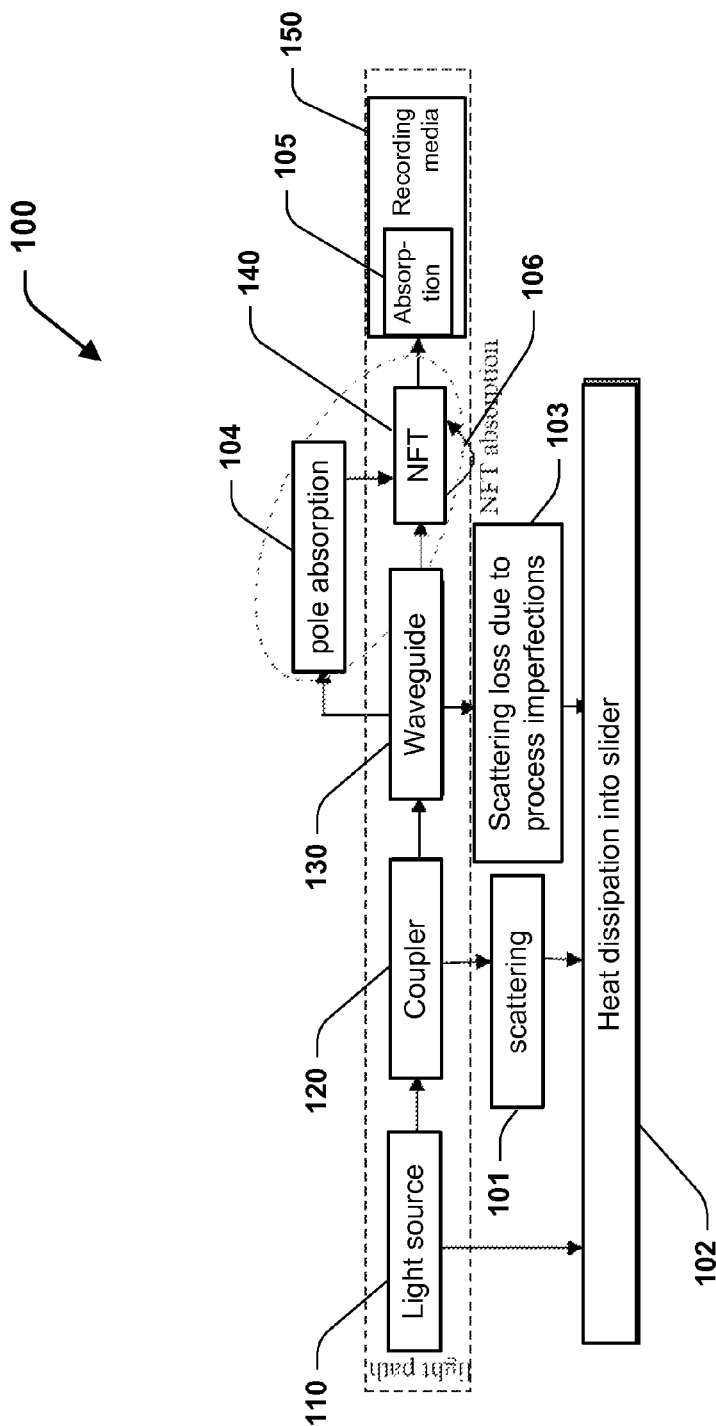
FIG. 1 is a block diagram depicting an exemplary optical EAMR module.
Figure 2A:
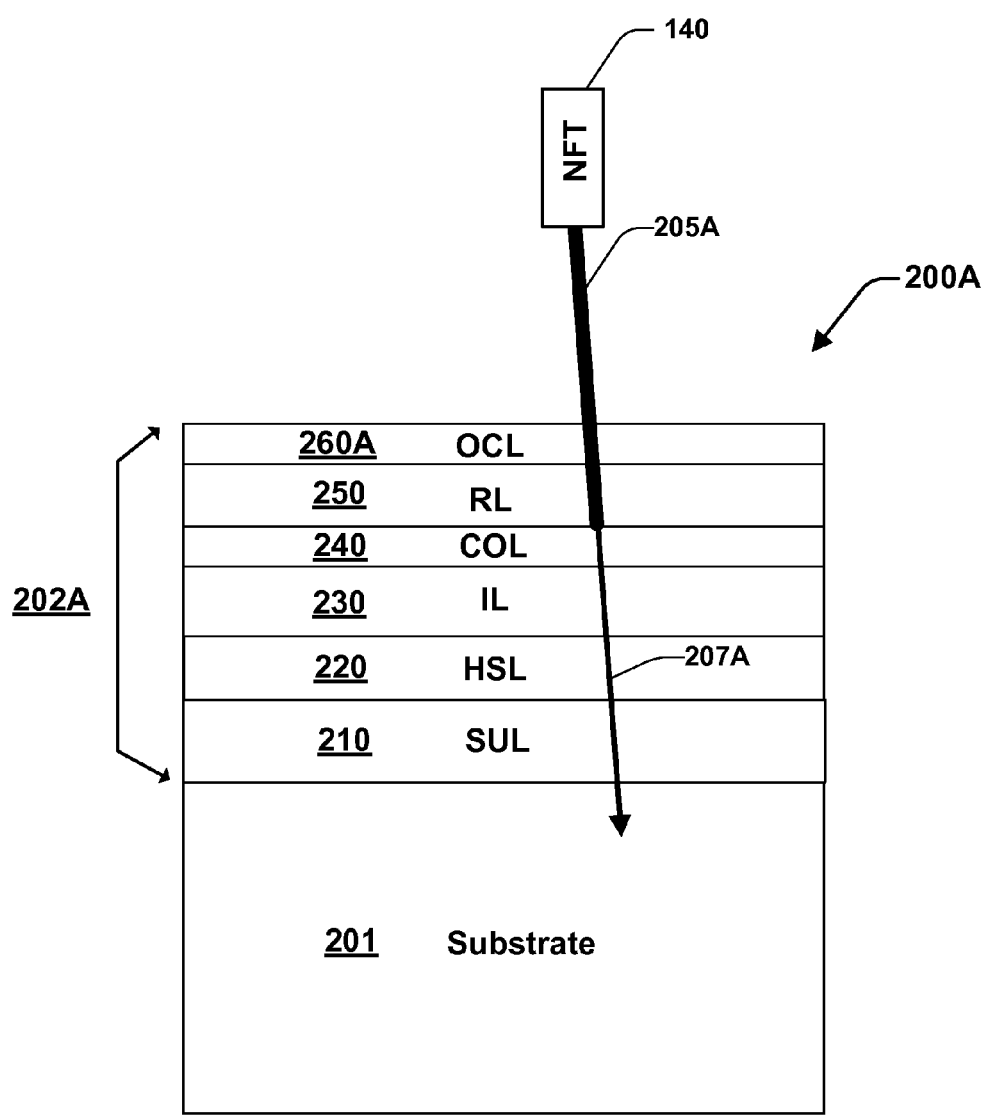
FIG. 2A is a diagram depicting a cross-sectional view of an EAMR recording media.

FIG. 2A is a diagram depicting a cross-sectional view of an EAMR recording media 200A. The media 200A includes a substrate 201, which can be glass or aluminum, and a media stack 202A disposed over the substrate 201. The media stack 202A can be built layer by layer. In the illustrated example, a Soft Under-Layer (SUL) 210 is deposited over the substrate 201, followed by a heat-sink layer (HSL) 220. One of the purposes of the HSL 220 is to cool down a recording region quickly after a bit is written so as to avoid the thermal erase effect which may cause inter-bit interference (IBI) or inter-track interference (ITI). A magnetic interlayer (IL) 230 is deposited over the HSL 220, followed by a crystallization orientation control layer (COL) 240 and a recording layer (RL) 250. Subsequently, an overcoat layer (OCL) 260 is deposited over the RL 250 to protect the recording layer from possible scratches or other damages during operation. In conventional media stacks, the OCL 260 is comprised of a diamond-like carbon (DLC), typically having a refractive index of about 2.0. In certain embodiments, a lubricant layer is deposited on top of the OCL 260. The media stack 202A can have a more complex layer-structure that includes additional layers to optimize the magnetic performance.

Electromagnetic energy 205A from the NFT 140 is incident on the media 200A. A first portion of the incident energy 205A is absorbed by the RL 250, while a second portion 207A of the incident energy 205A passes through the underlying layers 240, 230, 220, 210 of the media stack 202A and is eventually absorbed or scattered at the substrate 201. Therefore, the second portion 207A of the incident energy 205A is not used for heating a recording region of the recording layer 250 and is therefore wasted.

Figure 2B:
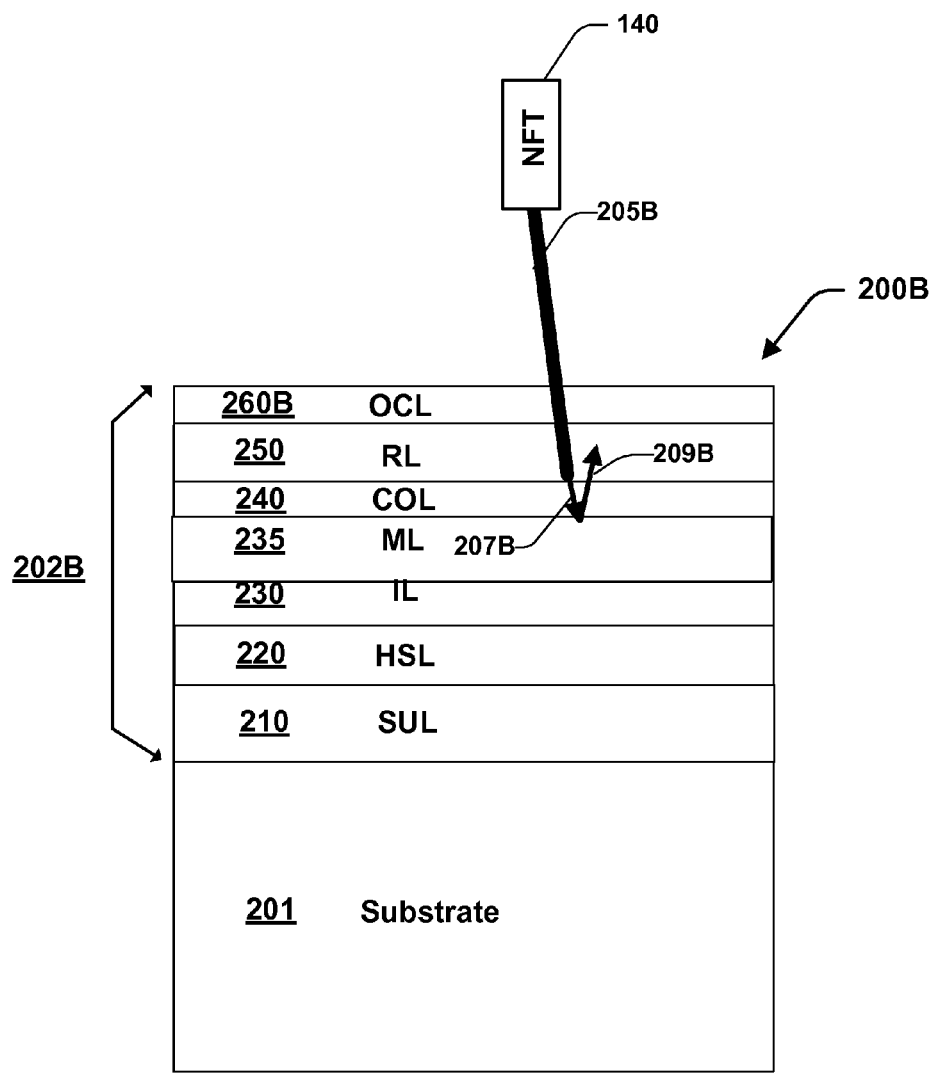
FIG. 2B is a diagram depicting a cross-sectional view of an exemplary EAMR recording media having a media stack that is configured to maximize the energy absorption at the recording layer according to certain aspects of the present disclosure.

As indicated above, for optimal heat management, it is beneficial to maximize energy absorption by the recoding media. This can be achieved optimally by maximizing the energy absorption by the RL 250. FIG. 2B is a diagram depicting a cross-sectional view of an exemplary EAMR recording media 200B having a media stack 202B that is configured to maximize the energy absorption at the RL 250 according to certain aspects of the present disclosure. The media stack 202B has a similar layer-structure as the media stack 202A of FIG. 2A, except that the media stack 202B further includes a metallic layer (ML) 235 disposed between the COL 240 and the IL 230. The ML 235 comprises a non-magnetic metal such as Au, Ag, Al, and Cu. In certain embodiments, overcoat layer (OCL) 260B of the media stack 202B includes the conventional DLC. In other embodiments, the OCL 260B is a high dielectric material other than DLC such as AlN or $Si_2N_4$.

Electromagnetic energy 205B from the NFT 140 is incident on the media 200B. A first portion of the incident energy 205B is absorbed by the RL 250, while a second portion 207B of the incident energy 205B passes through the RL 250. However, unlike in the media 200A of FIG. 2A, a substantial portion of the second portion 207B of the incident energy 205B is reflected by the metallic layer (ML) 235 and returned to the RL 250 in the form of a reflected portion 209B of the incident energy 205B. Some of the reflected portion 209B is absorbed by the RL 250, thereby increasing the net energy absorption at the RL layer 250 (hereinafter referred to as the "RL absorption").

Figure 3A:
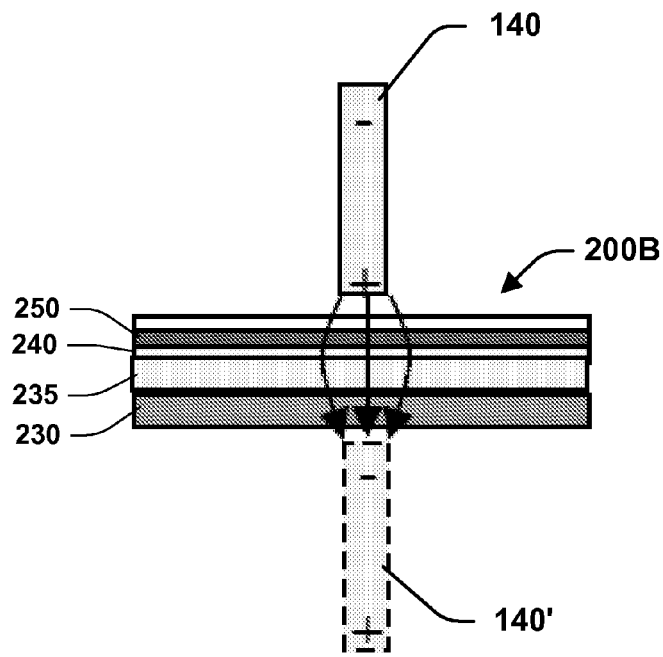
FIG. 3A is a diagram depicting an NFT as a dipole and its image below a metallic layer in a media stack comprising a recording layer and the metallic layer according to certain aspects of the present disclosure.

In this sense, the ML 235 acts as a mirror in the media stack 202B to reflect at least some of the electromagnetic energy that is not initially absorbed by the RL 250 back to the RL 250. As illustrated in FIG. 3A, a nano-sized antenna type NFT 310, in a simple model, can be regarded as a dipole, and the ML 235 creates an image 140' of the NFT 140 below the ML 235. The intensity of the electric field between the NFT 140 and its dipole image 140' is substantially stronger with the ML 235 than without it and strongly depends on the relative distance between NFT 140 and its image 140'. The relative distance between the NFT 140 and its image 140' is in turn proportional to the distance between the NFT 140 and the ML 235. The amount of net absorption of the electromagnetic energy in the RL 250 is proportional to the electric field intensity. Accordingly, to maximize the RL absorption, the metal layer 235 is preferably disposed between the COL 240 and the IL 230 to minimize the distance between the NFT and the ML. In certain embodiments, the ML 235 comprises a non-magnetic metal, such as Au, Ag, Cu, Al, and has a thickness in the range between about 10 to 30 nm. In some embodiments, the RL 230 has a thickness in the range between about 5 to 10 nm.

Figure 3B:
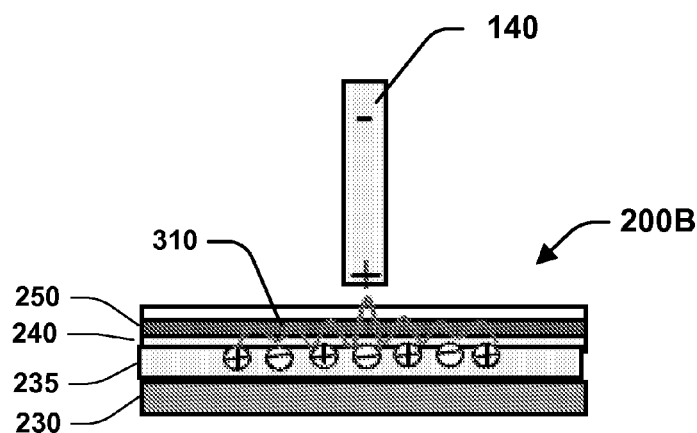
FIG. 3B is a diagram illustrating a surface plasmon resonance excited in a media stack comprising a recording layer and a metallic layer according to certain aspects of the present disclosure.

The RL absorption enhancement due to the presence of the ML 235 can also be explained in terms of a surface plasmon resonance (SPR) effect as illustrated in FIG. 3B. A highly localized resonant charge density wave ("surface plasmon resonant wave") is excited along the interface between COL 240 and ML 235 by the electromagnetic energy delivered from the NFT 140. The highly localized charge density wave enhances the local electric field intensity inside the RL 230, thereby causing a higher RL absorption therein. This way, a higher temperature with the same input laser power can be achieved. The thickness of the ML 235 is set to about a skin depth of the non-magnetic metal comprising the ML 235 at a wavelength of the electromagnetic energy. Because the charge density wave is mostly confined within the skin depth, an ML thickness larger than the skin depth does not further increase the RL absorption. In certain embodiments, the RL absorption is enhanced by between about 5% to 50% due to the presence of the ML 235.

To verify this concept, an EAMR media having a 15 nm-thick CrRu IL layer, a 2 nm-thick MgO COL layer, a 8 nm-thick FePt RL layer and a 2 nm carbon OC layer is included in a Finite Difference Time Domain (FDTD) model together with an NFT with pin width 30 nm and pin thickness 50 nm. The FDTD model also takes into account the presence of an Au ML layer of varying thicknesses. The RL absorption is calculated by integrating Joule Heating within a 100×100×8 nm³ volume of the RL layer under the NFT with consideration of a sub-fifty nm² desired spot size.

In the FDTD model, the RL absorption is given by:

$$P_{abs} = \oiiint \frac{1}{2} \text{Re}(\sigma)|E|^2 dv \qquad (1)$$

where E is the electric field amplitude and $\sigma$ is the complex optical conductivity of a lossy recording layer which is related with optical dielectric constant or refractive index as follows:

$$\sigma = i2\pi f \varepsilon_0 (\varepsilon_r - 1) \qquad (2)$$
$$= -i2\pi f \varepsilon_0 (n^2 - k^2 - 1) + 4\pi nk f \varepsilon_0$$

The power absorbed by recording layer can be derived by inserting Equation (2) into Equation (1) as follows:

$$P_{abs} = \oiiint \frac{1}{2} \text{Re}(\sigma)|E|^2 dv \qquad (3)$$
$$= 2\pi \oiiint nk f \varepsilon_0 |E|^2 dv$$

Figure 4:
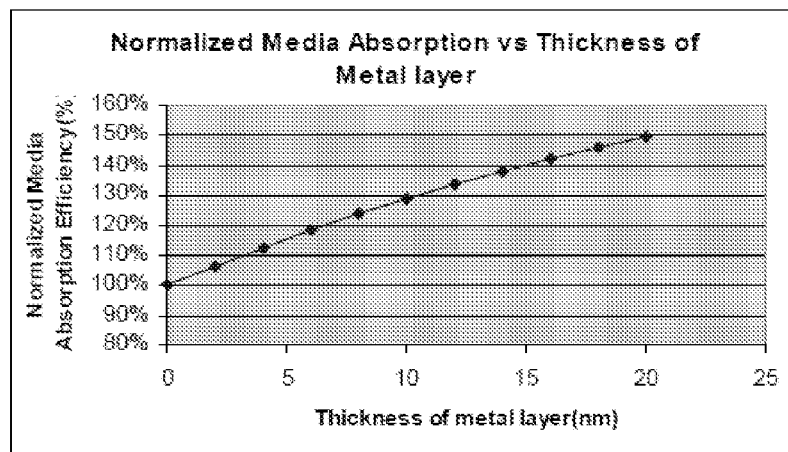
FIG. 4 is a graph illustrating a media absorption efficiency of a media stack with an Au ML layer normalized to a media stack without an Au ML layer according to certain aspects of the present disclosure.

The media absorption efficiency—the ratio of RL absorptions—for the case with the Au ML layer normalized to the case without the Au ML layer is shown in FIG. 4. As seen in the figure, the media absorption efficiency with the Au ML layer is enhanced by 50% when the ML layer is 20 nm thick. Considering that the skin depth of Au is around 25 nm at the wavelength of the electromagnetic energy included in the model, a further increase in the thickness of the Au ML layer may not increase the media absorption efficiency further, but it can affect the heat sink of EAMR media stack and thus the dynamic performance of the media.

Figure 5:
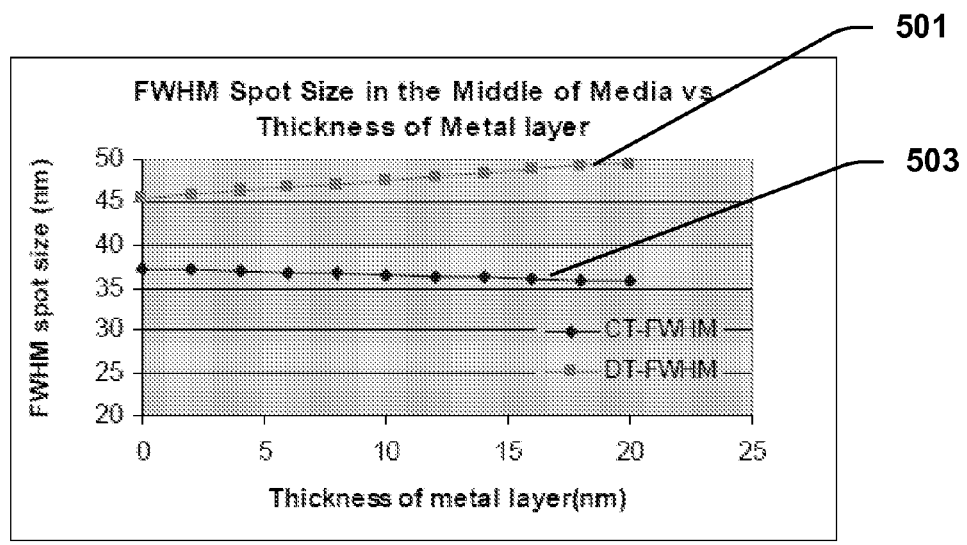
FIG. 5 is a graph illustrating the effects of an Au ML layer of varying thicknesses on CT FWHM and DT FWHM of the electromagnetic energy in the middle of the recording layer according to certain aspects of the present disclosure.

An additional advantage accrued from the presence of an ML layer is that the layer can have the effect of decreasing the cross-track (CT) FWHM, which is mainly determined by the Critical Dimension (CD) of NFT pin width. The down-track (DT) FWHM is mainly determined by the thickness of the pin, which is much easier to control than the NFT pin width during the pin fabrication. FIG. 5 is a graph depicting a first trace 501 and a second trace 503 that illustrate the effects of the Au ML layer of varying thicknesses on CT FWHM and DT FWHM, respectively, of the electromagnetic energy in the middle of a recording layer.

Figure 6:
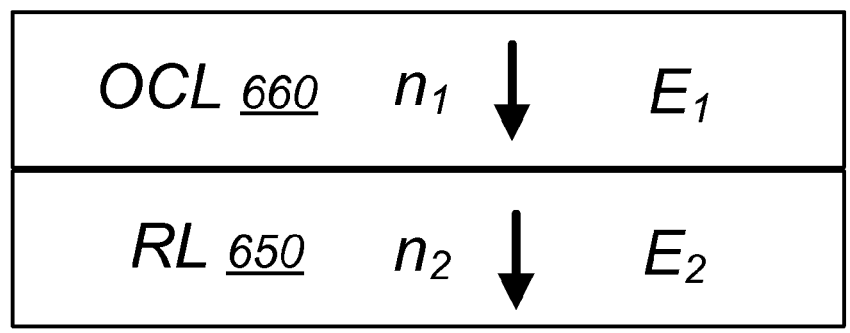
FIG. 6 is a diagram depicting an overcoat layer having a refractive index of $n_1$ and an electric field strength of E1 disposed over a recording layer having a refractive index of $n_2$ and an electric field strength of E2.

Another way to increase the RL absorption is to increase the dielectric constant of the overcoat layer (OCL). FIG. 6 is a diagram depicting an overcoat layer (OCL) 660 having a refractive index of $n_1$ and an electric field strength of E1 disposed over a recording layer (RL) 650 having a refractive index of $n_2$ and an electric field strength of E2. It is known that the field polarization of antenna type of NFT is longitudinally dominant. This fact, coupled with the continuity condition of the normal component of electric displacement D cross the interface of the OCL 660 and the RL 650, requires that the electric intensity inside the RL 650 is given by:

$$\frac{I_2}{I_1} = \left(\frac{E_2}{E_1}\right)^2 = \left(\frac{n_1}{n_2}\right)^2 \qquad (4)$$

where $I_1$, $E_1$ and $n_1$ are the field intensity, electric field amplitude and refractive index inside the OCL 660 respectively, while $I_2$, $E_2$, and $n_2$ are corresponding parameters inside the RL 650. Accordingly, by increasing $n_1$, the field intensity inside the RL 650 and, hence, the RL absorption can be enhanced.

Figure 7:
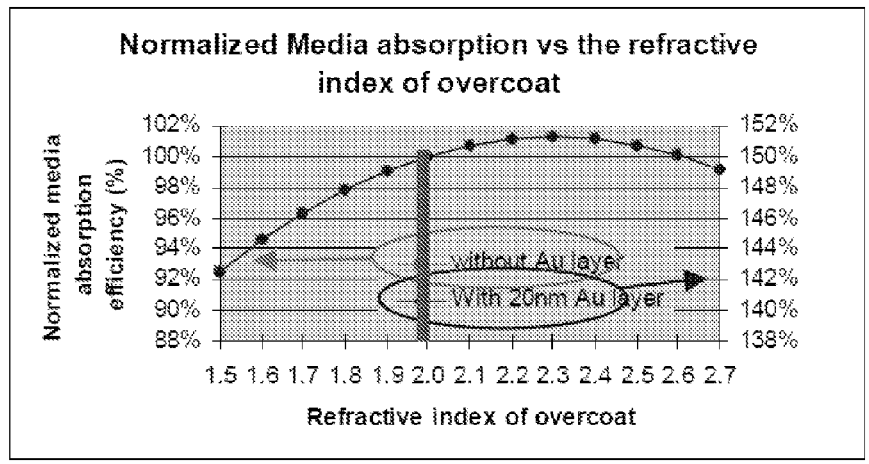
FIG. 7 is a graph of the media absorption efficiency versus the refractive index of a media stack having an Au metallic layer and a high refractive index overcoat layer normalized to a media stack without a ML layer and having a DLC overcoat layer according to certain aspects of the present disclosure.

FIG. 7 is a graph of the media absorption efficiency versus the refractive index of a media stack having an Au metallic layer and a high refractive index overcoat layer normalized to a media stack without a ML layer and having a DLC overcoat layer with a refractive index of 2.0 according to certain aspects of the present disclosure. Compared to the lowest refractive index value of 1.5, a higher refractive index value causes an improvement to the media absorption efficiency of about a few percentage, but not as much as the improvement that the presence of an Au ML layer has on the efficiency. As compared to the DLC case, a higher $n_1$ (e.g., 2.3) can enhance the media absorption efficiency by about 1 percent. Therefore, a net enhancement of the RL absorption can be achieved by the use of a high dielectric material such as AlN or $Si_2N_4$ in place of the conventional DLC.

Figure 8:
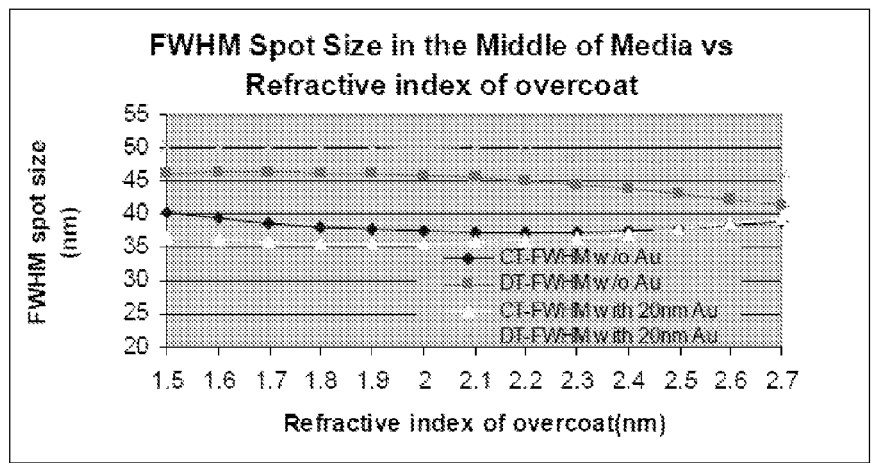
FIG. 8 is a graph illustrating the effects of varying refractive index of the overcoat layer on CT FWHM and DT FWHM of the electromagnetic energy in the middle of the recording layer according to certain aspects of the present disclosure.

FIG. 8 is a graph illustrating the effects of varying refractive index of the overcoat layer (OCL) on CT FWHM and DT FWHM of the electromagnetic energy in the middle of the recording layer (RL) according to certain aspects of the present disclosure. As shown in the figure, the Down-Track FWHM (DT-FWHM) spot size inside the RL layer 650 decreases monotonically by several nanometers when the refractive index of the OCL 660 increases for cases with and without an Au ML layer. However, the Cross-Track FWHM (CT-FWHM) spot size increases slightly at higher values (e.g., >2.0) when the Au ML layer is introduced.

Various recording media designs and methods described herein can provide a superior heat management for EAMR systems by increasing energy absorption at the recording layer. The increased RL absorption is achieved by the introduction of a metallic layer between the recording layer and a substrate and/or the use of a high refractive index dielectric material for the overcoat layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording media, comprising:
   a substrate;
   a recording layer disposed over the substrate and configured to:
      receive an electromagnetic radiation,
      absorb a first portion of the electromagnetic radiation, and
      transmit a second portion of the electromagnetic radiation; and
   a metallic layer disposed between the recording layer and the substrate, the metallic layer comprising a non-magnetic metal and configured to reflect at least some of the second portion of the electromagnetic radiation towards the recording layer,
   wherein a third portion of the reflected electromagnetic radiation is absorbed by a region of the recording layer.

2. The media of claim 1, wherein the first portion and the third portion heat the region to reduce the coercivity thereof during a write operation.

3. The media of claim 1 further comprising a crystallization orientation control layer disposed between the recording layer and the metallic layer, and a magnetic interlayer disposed between the metallic layer and the substrate.

4. The media of claim 1 further comprising an overcoat layer disposed over the recording layer.

5. The media of claim 4, wherein the overcoat layer comprises diamond-like carbon (DLC).

6. The media of claim 4, wherein the overcoat layer comprises a dielectric material having a refractive index greater than 1.5.

7. The media of claim 6, wherein the dielectric material is AlN or $Si_2N_4$.

8. The media of claim 6, wherein the non-magnetic metal is selected from a group consisting of one or more of Au, Ag, Al, and Cu.

9. A magnetic recording media, comprising:
   a substrate;
   a recording layer disposed over the substrate and configured to:
   receive an electromagnetic radiation,
   absorb a first portion of the electromagnetic radiation, and
   transmit a second portion of the electromagnetic radiation; and
   a metallic layer disposed between the recording layer and the substrate, the metallic layer comprising a non-magnetic metal and configured to reflect at least some of the second portion of the electromagnetic radiation towards the recording layer,
   wherein the electromagnetic radiation comprises electromagnetic energy from a near field transducer (NFT) of an energy assisted magnetic recording (EAMR) head disposed over the media,
   wherein the electromagnetic energy has a power in the range between about 0.1 to 0.5 mW and a wavelength in the range between about 600 to 1000 nm.

10. The media of claim 1, wherein the recording layer comprises FePt.

11. The media of claim 10, wherein the recording layer further comprises $SiO_2$ or C.

12. The media of claim 1, wherein the metallic layer has a thickness that is about a skin depth of the non-magnetic metal at a wavelength of the electromagnetic radiation.

13. The media of claim 1, wherein the metallic layer has a thickness in the range between about 10 to 30 nm.

14. The media of claim 1, wherein the recording layer has a thickness in the range between about 5 to 10 nm.

* * * * *